RECORDING AND REPRODUCING SYSTEM UTILIZING ONLY ALTERNATE FIELDS OR FRAMES OF THE VIDEO SIGNAL

Filed July 14, 1966 3 Sheets-Sheet 1

INVENTOR.
NOBUTOSHI KIHARA
BY
Ward, Haselton, McElhannon, Orme, Brooks & Fitzpatrick
ATTORNEYS INVENTOR.
NOBUTOSHI KIHARA
BY
Ward, Haselton, McElhannon, Orme, Brooks & Fitzpatrick
ATTORNEYS INVENTOR.
NOBUTOSHI KIHARA
BY
Ward, Haselton, McElhannon, Orme, Brooks & Fitzpatrick
ATTORNEYS.

3,524,018
RECORDING AND REPRODUCING SYSTEM UTILIZING ONLY ALTERNATE FIELDS OR FRAMES OF THE VIDEO SIGNAL

Nobutoshi Kihara, Tokyo, Japan, assignor to Sony Corporation, Tokyo, Japan, a corporation of Japan Filed July 14, 1966, Ser. No. 569,785
Claims priority, application Japan, July 17, 1965, 40/43,295, 40/43,296
Int. Cl. H04n 5/78
U.S. Cl. 178—6.6 13 Claims

ABSTRACT OF THE DISCLOSURE

In apparatus for recording and reproducing video signals, only alternate fields or frames of the video signals are recorded on a magnetic tape or other recording medium and, upon reproduction of the video signals, each field or frame signal reproduced from the tape is supplied to an output and simultaneously recorded on a second recording medium from which the field or frame signal is reproduced and supplied to the output in the interval between successive field or frame signals reproduced from the first mentioned recording medium.

This patent application is a continuation-in-part of patent application Ser. No. 475,070 entitled "Recording and Reproducing System" which was filed on July 27, 1965, and on which U.S. Patent No. 3,359,365, issued Dec. 19, 1967.

This invention relates generally to a recording and reproducing system which is adapted to record and/or reproduce video signals on a magnetic tape, the information being stored on the magnetic tape on parallel record tracks which extend obliquely across the tape, and more particularly to such a system in which only a portion of the video signal is recorded.

In systems presently being used to record and/or reproduce video signals on a magnetic tape, such systems being commonly referred to as video tape recorders, each field or frame of the video signal is recorded along a track on the magnetic medium and then is in some manner selectively reproduced. In such prior art systems, however, the recording time for one reel of tape is limited due to the large quantity of tape that must be used and consequently with such prior art systems an extended series of video signals cannot be recorded for a long period of time without interruption.

This problem was to a very large extent overcome by the invention in co-pending patent application Ser. No. 475,070 which is based upon the fact that there is no appreciable difference in the information content of adjacent or slightly spaced fields or frames of a television signal. Accordingly, even if the video signal corresponding to a certain field or frame of a television signal is replaced, for example, by an adjacent or slightly spaced field or frame, the variation or change cannot be recognized by the naked eye. In co-pending application Ser. No. 475,070 there is accordingly set forth a recording and/or reproducing system in which spaced video signals of only specified fields or frames of a continuous train of fields or frames are recorded on a magnetic tape in the form of skew magnetic tracks, and during reproduction each of these tracks is reproduced a plurality of times to obtain a series of signals. In one embodiment of the invention set forth in patent application Ser. No. 475,070 every other field or frame of a video signal is recorded, i.e., only half the fields or frames of the video signal are recorded, and then during reproduction each of the tracks corresponding to a field or frame is reproduced twice to thereby obtain a series of signals equal in number to the series of signals originally present.

In one of the systems set forth in co-pending patent application Ser. No. 475,070 two rotary magnetic heads H*a* and H*b* are used. These heads are spaced apart a predetermined angular distance $\phi$ and a predetermined axial distance M. The rotary magnetic head H*a* comes into contact with the magnetic tape at every half cycle of revolution and the duration of this contact corresponds to that of approximately one field. In this manner every other field is recorded on the magnetic tape. During reproduction the magnetic heads H*a* and H*b* scan the magnetic tracks on the magnetic tape. Each track on the magnetic tape is scanned by each head thereby reproducing a composite video signal. The registration of the heads is accomplished by properly selecting several variables including the angular distance $\phi$ between the heads H*a* and H*b* and the axial distance M.

It has been found however that it is difficult to adjust the angular distance $\phi$ and the axial distance M in order to reproduce good video signals. In addition, in the system set forth in co-pending patent application Ser. No. 475,070 two rotary magnetic heads of the same type are employed and since they scan the magnetic tape alternately under high contact pressure the heads wear out fairly quickly and it is necessary to change both of these expensive heads at the same time.

In accordance with the present invention only one rotary magnetic head is provided and during recording this rotary magnetic head records half the picture, i.e., only every other field or frame of a video signal is recorded. In addition to the single rotary magnetic head a static recording head, a static playback head and a static erase head is provided for recording and reproducing a video signal on a rotary magnetic sheet. During reproduction the rotary magnetic head reproduces each field or frame that had previously been recorded. This signal is fed to an output terminal and also to the static recording head so that the signal is recorded on the magnetic sheet. During the interval when the rotary magnetic head does not reproduce a signal the static reproducing head reproduces the stored video signal from the magnetic sheet and also feeds that signal to an output terminal. There is thus obtained at the output terminal a composite video signal. Since the contact pressure between the stationary heads and the rotary magnetic sheet is very small the life of these static heads is much longer than the life of the rotary magnetic head. The system of the present invention can also be utilized to record and reproduce slow motion pictures and a still picture.

These and further objects, features and advantages of the present will appear from a reading of the following detailed description of several embodiments of the invention which are to be read in conjunction with the accompanying drawings in which similar components in the several views are identified by the same reference numeral.

Figures 1, 3:
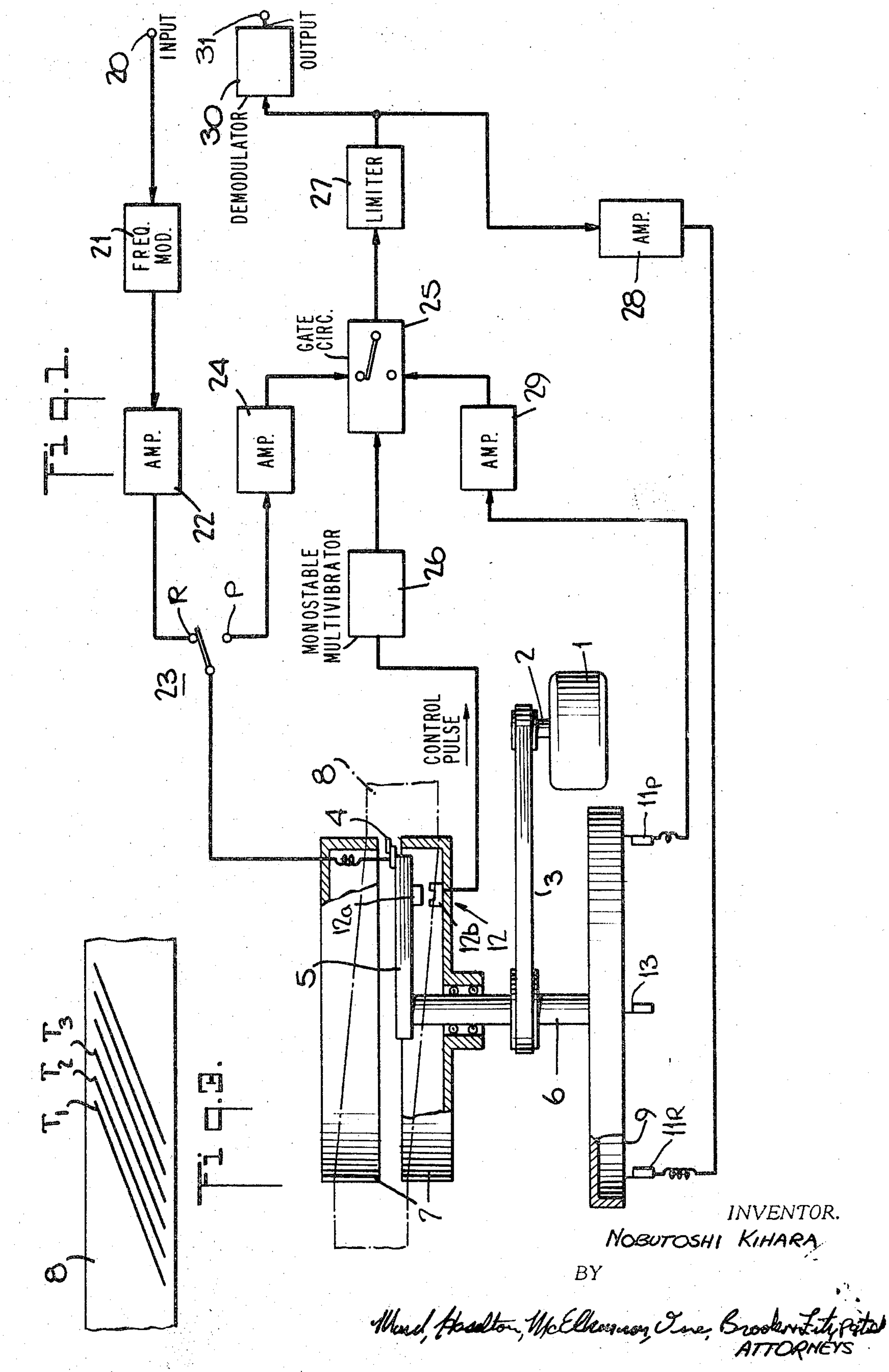
FIG. 1 is a side view of a rotary magnetic head assembly for use in a magnetic recording and/or reproducing system according to the present invention, the figure further illustrating a block diagram for the operation of the apparatus of the present invention.
FIG. 3 illustrates the magnetic tracks formed on a magnetic tape by the rotary magnetic head of the present invention, the magnetic tracks being enlarged many times for purposes of illustration.
Figure 2:
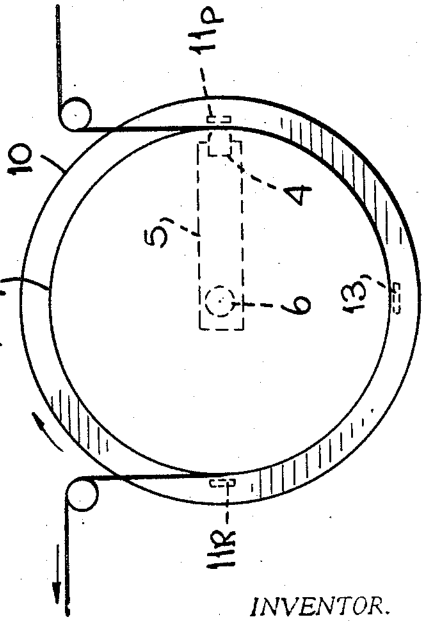
FIG. 2 is a schematic plan view illustrating in composite form the rotary magnetic head assembly and the stationary record, reproduce and erase heads of the present invention.

Referring now to the drawings and particularly to FIGS. 1 and 2 there is illustrated a rotary arm 5 mounted on a rotary shaft 6, the shaft 6 and consequently the arm 5 being rotated by a motor 1. The shaft 2 of the motor 1 is connected to the shaft 6 by means of a transmission device 3 which is illustrated in FIG. 1 consists of two pulleys. The two pulleys are respectively mounted on the shafts 2 and 6 and are interconnected by a belt. The periphery of the rotary arm 5 has mounted thereon a rotary magnetic head 4 for recording and/or reproducing video signals on a magnetic tape 8. The rotary arm 5 and consequently the rotary magnetic head 4 are rotated by the shaft 6, the rotary arm 5 being rotated at the rate of 30 cycles per second. The magnetic tape 8 is directed around a cylindrical guide number 7 by means of guide rollers which are positioned obliquely to the direction of travel of the tape.

With the apparatus thus far described and illustrated in FIGS. 1 and 2 video signals consisting of one frame with two fields are recorded on the magnetic tape 8 by the rotary magnetic head 4, the recording being in the form of parallel skew magnetic tracks $T_1$, $T_2$, $T_3$, etc. as illustrated in FIG. 3. The signals from only odd number fields can be recorded on each of the tracks illustrated in FIG. 3. Since the rotary magnetic head 4 comes into contact with the magnetic tape 8 only at every half cycle of revolution and the duration of this contact corresponds to that of approximately one field, the video signals of fields such as the first, second, third, etc. as illustrated in FIG. 4B are selectively recorded on the magnetic tape 8.

In order to reproduce a composite signal there is provided a rotary disk 10 which is attached to and rotated by the shaft 6 which also rotates the arm 5. The rotary disk 10 is attached to the shaft 6 at a distance spaced from the rotary arm 5 as illustrated in FIG. 1. The rotary disk 10 has attached thereto a magnetic sheet 9 and is held tightly on the rotary disk 10 by means of a flange as shown in the cut out portion of FIG. 1. The rotary disk has positioned adjacent the magnetic sheet 9 stationary heads 11R, 11P and 13. The stationary or static head 11R is a recording head for recording video signals reproduced by the rotary magnetic head 4. The stationary static head 11P is a playback head for reproducing the video signals recorded on the magnetic sheet 9 by means of the recording head 11R. The stationary static head 13 is an erase head for erasing the video signals recorded on the magnetic sheet 9.

In order to record the switch 23, which is a combination record-playback switch, is place din the record position which is indicated by the designation R. During recording the rotary magnetic head 4 records as previously described half the picture, i.e., every other field is recorded on the magnetic tape 8. The video signal is applied to the video signal input terminal 20 and to the rotary magnetic head 4 through the frequency modulation circuit 21, the recording amplifier 22 and the recording contact switch 23R.

When it is desired to reproduce the video information recorded on the magnetic tape 8 the record-playback selecting switch 23 is placed in the playback position which is indicated by the letter P. In this position when the rotary magnetic head 4 scans the magnetic tracks $T_1$, $T_2$, $T_3$, etc. on the magnetic tape 8, the signal is supplied through the playback amplifier 24 to a gate circuit 25 which is controlled by the gate signal of a monostable, multivibrator circuit 26. The gate circuit 25 in a manner to be presently described selectively passes the signal from the playback amplifier 24 to the amplitude limiter 27. From the amplitude limiter 27 the playback signal is supplied to the demodulator circuit 30 and the recording amplifier 28. A demodulated video signal is obtained from the output terminal 31 and the reproduced signal is also recorded on the magnetic sheet 9 by means of the stationary recording head 11R. The gate circuit 25 is controlled by a signal from the multivibrator circuit 26 so as to pass the playback or reproduced signal to the amplitude limiter 27. The monostable multivibrator circuit is controlled by the output signal from the pulse generator 12.

Figure 5:
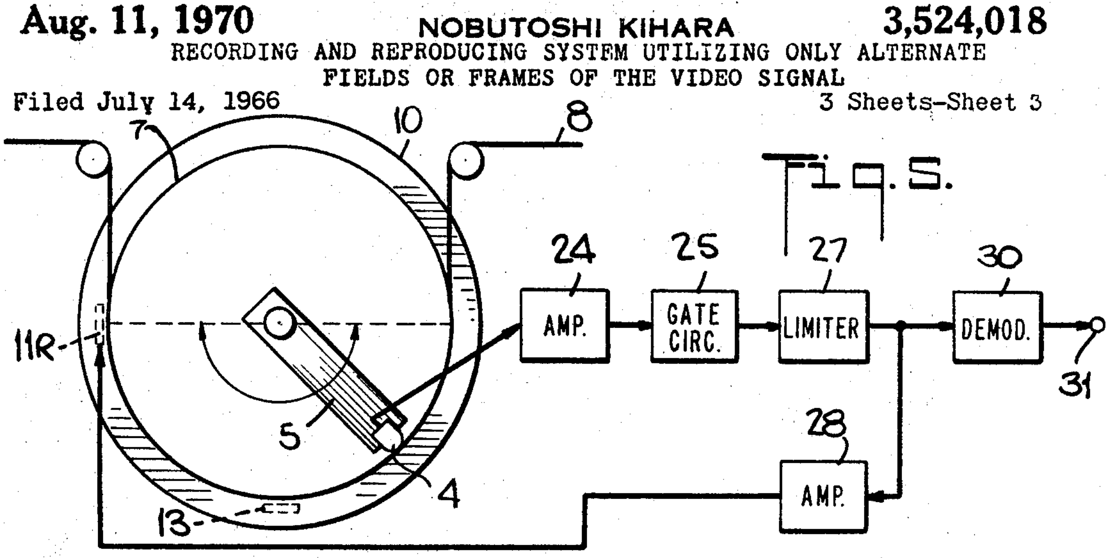
FIG. 5 is a view similar to FIG. 4 but at a different time during which the rotary magnetic head is reproducing a signal and the signal is simultaneously being recorded on the magnetic sheet by the stationary recording head.

The foregoing sequence is schematically illustrated in FIG. 5. In this sequence the rotary magnetic head 4 is in a position where it is scanning the magnetic tracks on the magnetic tape 8. During this position of the rotary magnetic head 4 the reproduced signal is fed both to the output terminal 31 and to the stationary recording head 11R to be recorded on the magnetic sheet 9.

Figure 6:
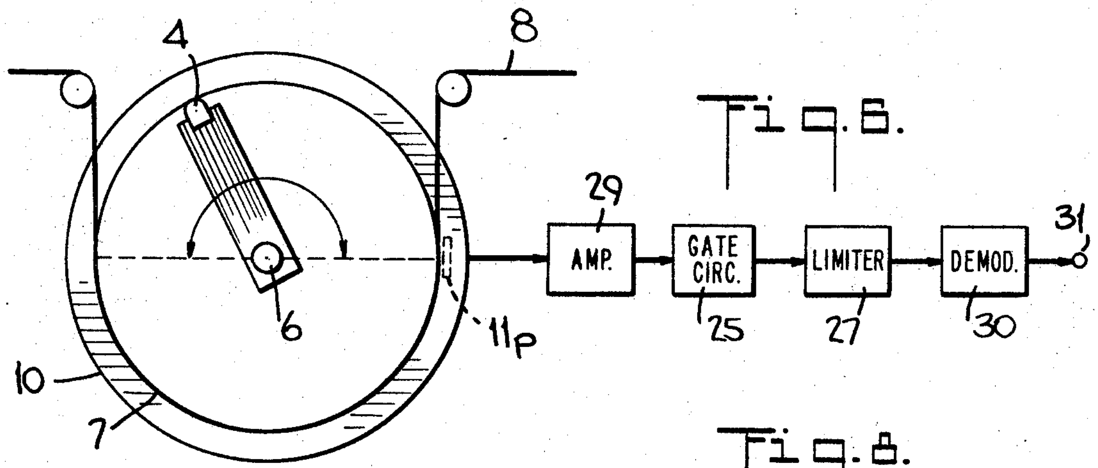
FIG. 6 is a view similar to FIGS. 2 and 5 but again at a different instant of time during which the rotary magnetic head is not reproducing a signal and during which the stationary recording head is reproducing the signal recorded on the magnetic sheet by the stationary recording head.

When the rotary magnetic head 4 is in a position where it does not playback or reproduce a signal, a playback signal is supplied by the stationary head 11P to the demodulation circuit 27 through a playback amplifier 29 and the gate circuit 25, and the demodulated video signal is obtained from the terminal 31. This sequence is schematically illustrated in FIG. 6, i.e., in this position the reproduced signal is supplied by the stationary head 11P rather than from the rotary magnetic head 4.

Figure 4:
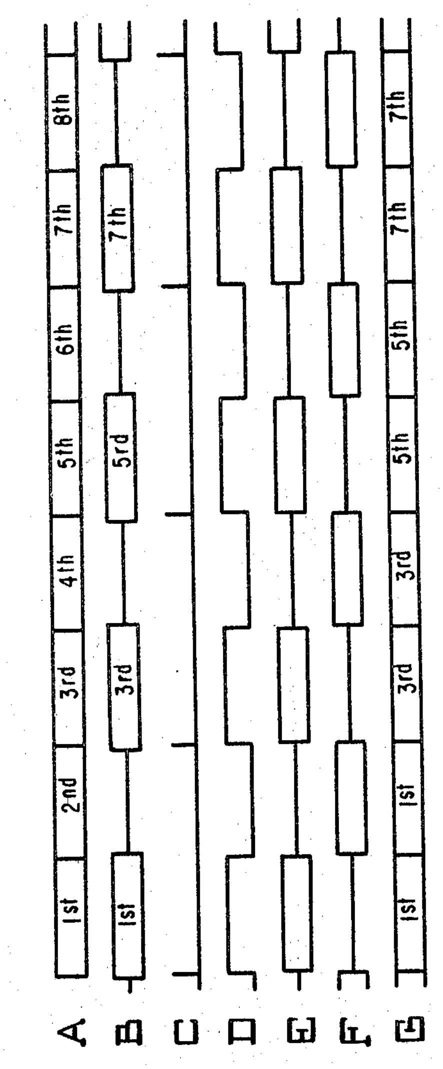
FIG. 4 illustrates in block form various video signal arrangements that are present in the system illustrated in FIG. 1.

The foregoing can best be described by reference to FIG. 4. In this figure the reference letter A indicates in block form the original video signals. The designation B indicates the recorded signal which as indicated has been sampled every two fields. The designation C indicates the 30 cycle per second pulse signals which are obtained from the pulse generator 12. The designation D indicates the gating signals which are produced by the multivibrator circuit 26 during one field period and the designation E identifies the demodulated video signals reproduced by the rotary magnetic head 4. The demodulated video signals reproduced by the playback stationary head 11P ie designated by the letter F while the designation G indicates the composite demodulated signal.

It can therefore be seen that the rotary magnetic head 4 records only every other field of the video signal. During reproduction the rotary magnetic head on one half cycle reproduces the video signal stored on the magnetic tape 8 and also feeds this reproduced signal to the stationary head 11R for recording on the magnetic sheet 9. During the interval that the rotary magnetic head 4 is not reproducing a signal from the magnetic tape 8 the stationary head 11P reproduces the signal that has previously been stored on the magnetic sheet 9. In this manner a composite video signal is obtained at the output terminal 31.

The pulse generator 12 controls the operation of the gate circuit 25. The pulse generator basically consists of a magnet 12*a* which is mounted on the rotary arm 5 and a pickup head 12*b* which reproduces a pulse of 30 cycles per second. The operation of the pulse generator is described in detail in my co-pending patent application Ser. No. 482,783 now U.S. Pat. 3,431,353.

Figure 9:
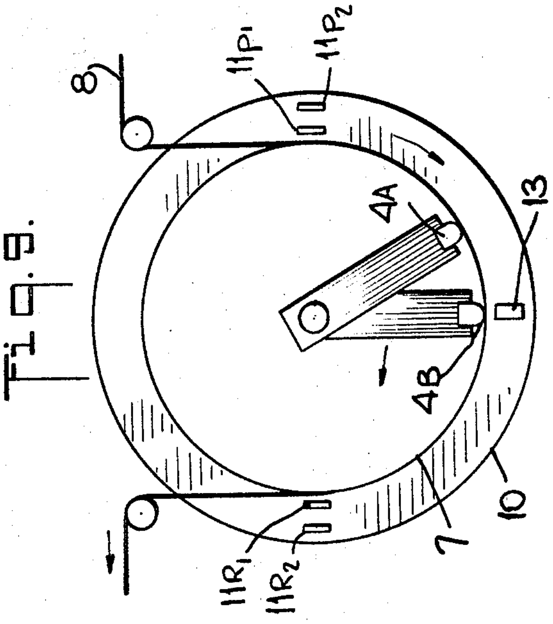
FIG. 9 is a view similar to FIGS. 2, 5, 6, 7 and 8 but illustrating a system for recording and reproducing color video signals.
Figure 7:
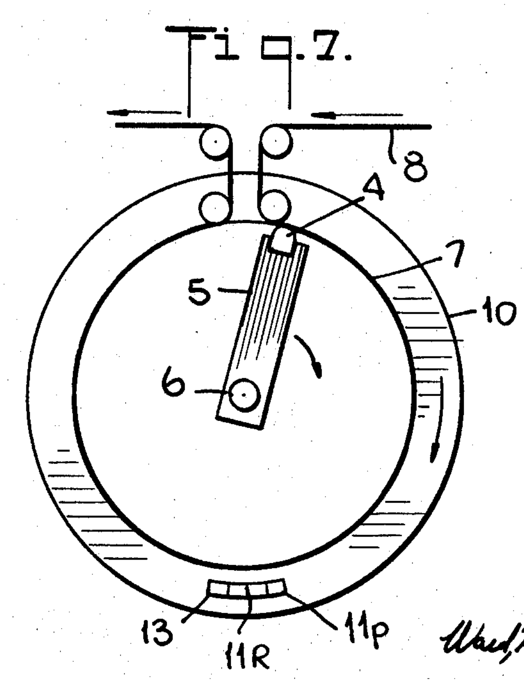
FIG. 7 is another view similar to FIGS. 2, 5 and 6 but illustrating a different physical arrangement for the stationary recording head, reproducing head and erasing head.

Another embodiment of the present invention for recording and reproducing black and white video signals is illustrated in FIG. 7. The application of the present invention for the recording and reproducing of color video signals is illustrated in FIG. 9. In this embodiment two rotary magnetic heads are provided as well as two stationary reproducing heads and two stationary recording heads. The heads 4A and $\mathbf{11R_1}$ are the Y signal recording heads while the 4B and $\mathbf{11R_2}$ heads are for recording the $I+Q$ signals. The stationary head $\mathbf{11P_1}$ is for reproducing the Y signal and the stationary head $\mathbf{11P_2}$ is for reproducing the $I+Q$ signal.

Figure 10:
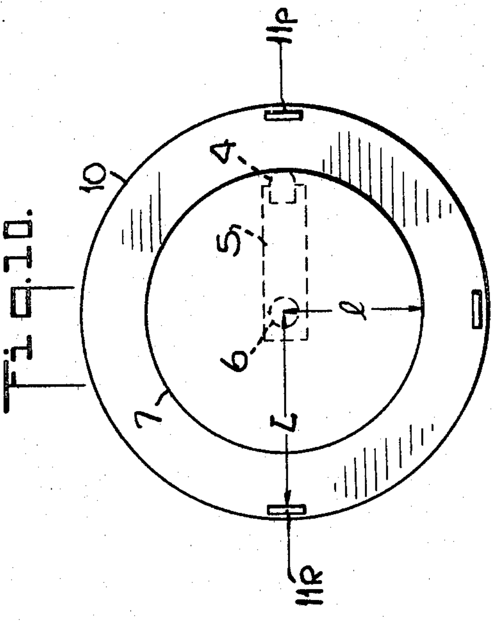
FIG. 10 is a view similar to FIG. 2 but illustrating another feature of the present invention.

In order to spread the frequency range of the playback signal recorded on the rotary magnetic sheet 9 it is preferred that the radius of the rotary disk 10 be larger than the radius of the cylindrical guide number 7. This is illustrated in FIG. 10 wherein the radius of the rotary disk 10 is indicated by the designation L and the radius of the cylindrical guide number 7 is indicated by the designation 1. This relationship, i.e., where L is greater than 1 permits the recording of higher frequency information in the track close to the edge of the sheet than would otherwise be possible in the track close to the center of the sheet.

Figure 8:
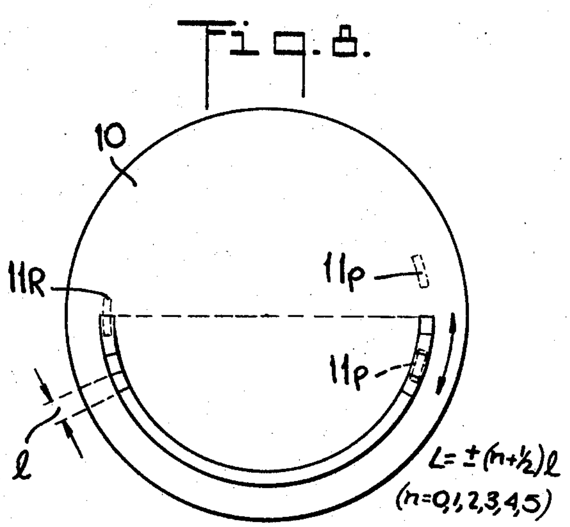
FIG. 8 is another view similar to FIGS. 2, 5, 6 and 7 and illustrating another feature of the invention.

While, on several embodiments of this invention, the stationary head 11P and the stationary head 11R are positioned approximately 180° apart, the position of the stationary head 11P needs to be correctly adjusted as shown in FIG. 8 for producing the interlaced video signal, where $l$ is a recorded length of one line signal on the sheet 10. The detailed description of the angular distance between the heads H$a$ and H$b$ is described in patent application Ser. No. 475,070.

While several embodiments of the invention have been illustrated and described it is to be understood that these were merely for the purpose of explanation. It will be apparent to those skilled in the art that many modifications and variations of the invention may be effected without departing from the scope of the novel concepts of the invention as set forth in the appended claims.

What is claimed is:

1. Apparatus for recording and reproducing only specified portions of video signals which portions are spaced in time whereby the quantity of recording medium necessary to record such portions of the signals is reduced by the portion of said signals not recorded, said apparatus comprising a rotary magnetic head, a first recording medium, means for guiding said recording medium past said rotary head whereby only said specified portions of said video signals are recorded on said recording medium, a second recording medium, a stationary recording head, circuit means activating said stationary recording head only during reproduction by said rotary magnetic head of said portions of the video signals recorded on said first recording medium whereby each of said reproduced signal portions is also recorded on said second recording medium, a stationary reproducing head, circuit means activating said stationary reproducing head when said stationary recording head is deactivated to thereby reproduce each of said portions of video signals recorded on said second recording medium interspersed between the portions of the video signals reproduced from said first recording medium whereby a composite video signal is reproduced identical in duration to said video signals prior to recording.

2. Apparatus for recording and reproducing video signals whereby only every other frame of said video signals is recorded and each of said recorded frames is reproduced twice during reproduction such that said reproduced signals are equal in duration to said original signals prior to recording, said apparatus comprising a rotary magnetic head, magnetic tape, guide means for guiding said tape past said rotary head whereby every other frame of said video signals is recorded on said tape in the form of tracks, means for scanning each of said tracks on said tape with said rotary head during reproduction so as to cause said rotary head to reproduce the signals in said tracks, means for recording on a recording medium said reproduced signals, and means for reproducing said signals from said recording medium during the intervals between the scanning of the tracks on the tape by said rotary head whereby the signals reproduced from said tracks of the magnetic tape and from said recording medium are interspersed and combine to form a visual image signal identical in duration to said video signals prior to recording.

3. Apparatus for recording and reproducing only every other frame of video signals whereby the quantity of magnetic tape necessary to record said signals is reduced by one half, said apparatus comprising a rotary magnetic head, means for rotating said head, magnetic tape, means for guiding said magnetic tape past said rotary head during recording whereby every other frame of said video signals is recorded on said tape in the form of tracks, a second recording medium, a stationary recording head, circuit means activating said stationary recording head only during reproduction by said rotary magnetic head of the frames of video signals recorded on said magnetic tape whereby each of said reproduced frames of video signals is also recorded on said second recording medium, a stationary reproducing head, circuit means activating said stationary reproducing head when said stationary recording head is deactivated to thereby reproduce each of said frames of video signals recorded on said second recording medium interspersed between said frames of video signals reproduced from said magnetic tape whereby a composite video signal is reproduced identical in duration to said video signals prior to recording.

4. Apparatus in accordance with claim 3 wherein said second recording medium is a magnetic sheet.

5. Apparatus in accordance with claim 4 wherein said rotary magnetic head and said magnetic sheet are mounted at spaced positions on the same shaft.

6. Apparatus in accordance with claim 5 wherein an erase head is interposed between said stationary recording head and said stationary reproducing head.

7. Apparatus in accordance with claim 6 wherein said rotary magnetic head and said magnetic sheet are concentrically mounted on the same shaft.

8. Apparatus in accordance with claim 7 wherein the activation and deactivation of said stationary recording and reproducing heads is controlled by a gate circuit.

9. Apparatus in accordance with claim 8 wherein the operation of said gate circuit is controlled by a pulse generator.

10. Apparatus in accordance with claim 9 wherein said stationary recording head and said stationary reproducing head are positioned approximately 180° apart.

11. Apparatus in accordance with claim 9 wherein said stationary recording and reproducing heads are positioned adjacent each other.

12. Apparatus in accordance with claim 9 wherein the diameter of said magnetic sheet is greater than the diameter of said tape guide means.

13. Apparatus for recording and reproducing color video signals whereby only every other frame of said color video signals is recorded and each of said recorded frames is reproduced twice during reproduction such that said reproduced signals are equal in duration to said original signals prior to recording, said apparatus comprising means for separating said color signals into luminance signals and chrominance signals, first and second rotary magnetic heads, means for rotating said rotary magnetic heads, magnetic tape, means for guiding said tape past said rotary magnetic heads whereby every other frame of said video signals is recorded on said tape in the form of parallel tracks oblique to the direction of travel of said tape, said luminance signals being applied to said first rotary magnetic head and said chrominance signals being applied to said second rotary magnetic head, a second recording medium, first and second stationary recording heads, circuit means activating said first and second stationary recording heads only during reproduction by said first and second rotary magnetic heads of the luminance and chrominance signals for every other frame of the video signals recorded on said magnetic tape whereby said reproduced luminance and chrominance signals are also recorded on said second recording medium, first and second stationary reproducing heads, circuit means activating said first and second stationary reproducing heads when said first and second stationary recording heads are deactivated to thereby reproduce said luminance and chrominance signals recorded on said second recording medium whereby the luminance and chrominance signals reproduced from said tape and from said second recording medium are interspersed and combine to provide a composite video signal identical in duration to said video signals prior to recording, and means for combining said reproduced luminance and chrominance signals to produce a color picture.

References Cited

UNITED STATES PATENTS

| | | |
|---|---|---|
| 3,234,323 | 2/1966 | Kihara. |
| 3,391,248 | 7/1968 | Hirota. |
| 3,395,248 | 7/1968 | Suzuki. |
| 3,402,257 | 9/1968 | De Lange. |

ROBERT L. GRIFFIN, Primary Examiner

J. A. ORSINO, Jr., Assistant Examiner

U.S. Cl. X.R.

179—100.2